Sept. 17, 1929. L. KRUPP 1,728,797
POWER OPERATED BRAKE
Filed Aug. 25, 1928  2 Sheets-Sheet 1
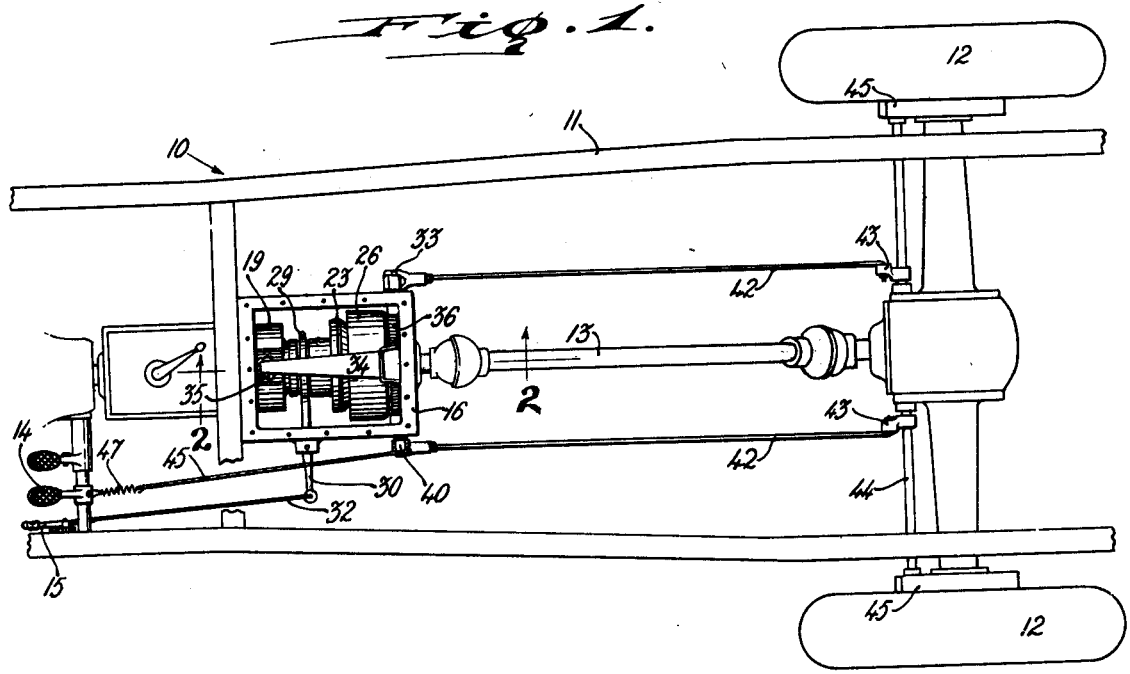
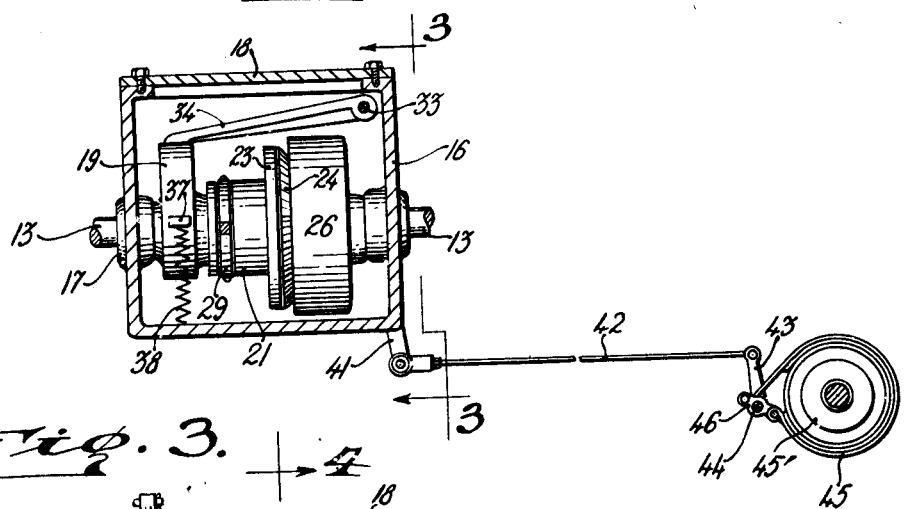
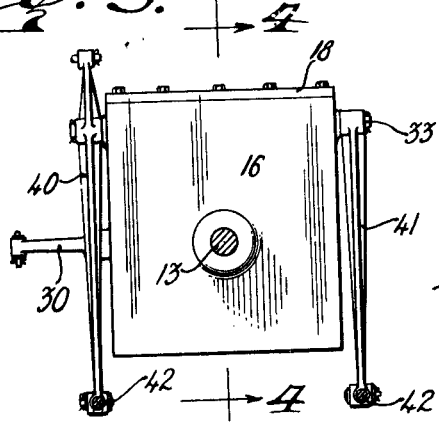
LOUIS KRUPP, INVENTOR
BY Victor J. Evans, ATTORNEY

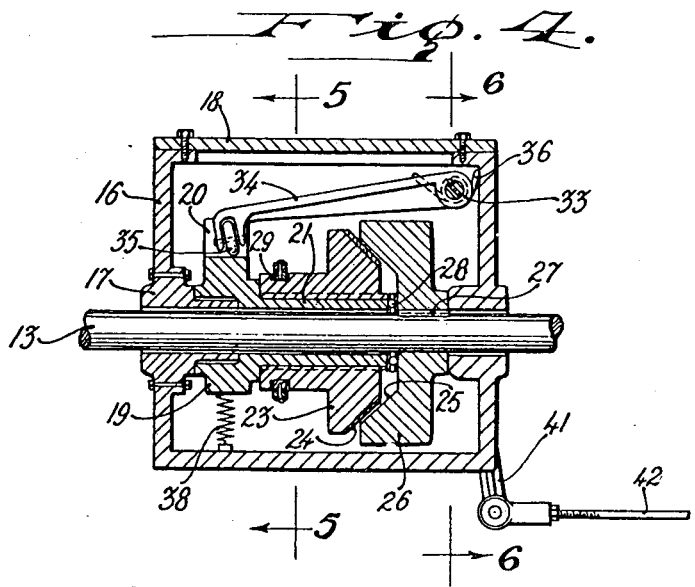
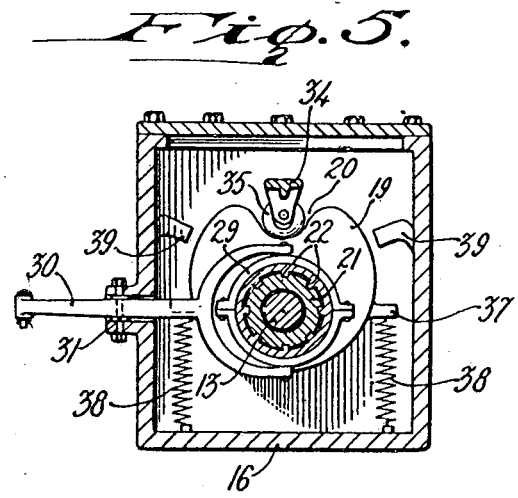
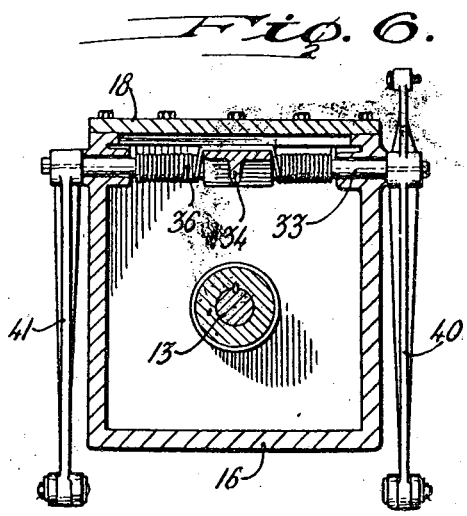
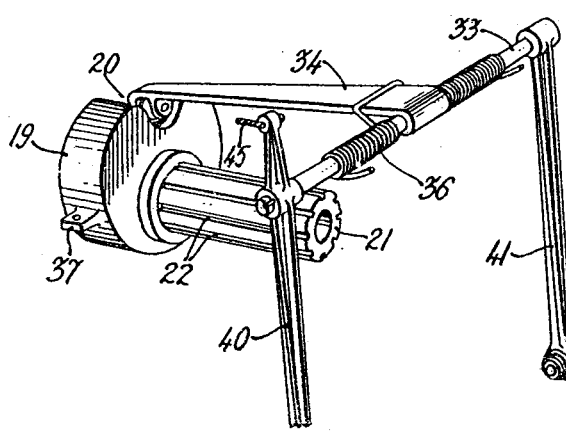

Patented Sept. 17, 1929

1,728,797

UNITED STATES PATENT OFFICE

LOUIS KRUPP, OF NEW YORK, N. Y.

POWER-OPERATED BRAKE

Application filed August 25, 1928. Serial No. 301,960.

This invention relates to power operated brakes for motor vehicles and is an improvement over my inventions shown and described in my prior Patent No. 1,656,070, dated January 10, 1928, and my co-pending application Sr. No. 230,627, filed November 2nd, 1927.

The primary object of this invention is the same as that set forth in my former applications above mentioned, namely to provide a brake device operated by the drive shaft of a motor vehicle, which is controlled by a hand lever in a manner to relieve the strain upon an operator of a vehicle when bringing the vehicle to a gradual or sudden stop. However, in this form of my invention, the construction has been modified to simplify the construction by the elimination of certain parts and the substitution of other more practical parts therefor.

Another object of my invention resides in the provision of a power operated brake device for motor vehicles in which the clutch pedal of the vehicle is actuated to disengage the drive clutch upon actuation of the brake device, and which clutch is independently operable for use to enable the shifting of the transmission gears.

With these and other objects in view, the invention resides in certain novel construction and combination and arrangement of parts, the essential features of which are hereinafter fully described, are particularly, pointed out in the appended claims, and are illustrated in the accompanying drawings, in which:—

Figure 1 is a top plan view of a chassis of a motor vehicle with my improved brake device applied thereto, with the cover plate removed.

Figure 2 is an enlarged vertical longitudinal sectional view on the line 2—2 of Figure 1.

Figure 3 is a vertical transverse sectional view on the line 3—3 of Figure 2.

Figure 4 is a vertical longitudinal sectional view on the line 4—4 of Figure 3.

Figure 5 is a vertical transverse sectional view on the line 5—5 of Figure 4.

Figure 6 is a similar view as the line 6—6 of Figure 4.

Figure 7 is a detail perspective view of the brake actuating mechanism.

Referring to the drawings by reference characters, the numeral 10 designates the chassis of a motor vehicle which includes the frame 11, rear wheels 12, a motor driven drive shaft 13, a clutch pedal 14 and a hand brake lever 15.

The drive shaft 13 extends through a housing 16, of my improved brake device which is fixedly supported by the chassis and which is journaled in a sleeve bearing 17 bolted to the front wall of the housing as clearly shown in Figure 4 of the drawings. The top of the housing is closed by a removable cover plate 18 by the removal of which access may be had to the working parts located within the housing and which will now be explained. Turnably mounted on the sleeve bearing 17 is a heart shaped cam member 19 which is eccentric with respect to the axis of the drive shaft 13 and which is provided with a concavity or recess 20 in its periphery.

The cam member 19 is provided with a tubular sleeve 21 through which the drive shaft freely passes and which has its exterior surface splined as at 22 for slidably receiving a friction clutch element 23 having its bevelled face 24 provided with a friction lining for coaction with the bevelled face 25 of a fixed clutch element 26 keyed to the drive shaft 13 as at 27. A ball bearing 28 is provided between the terminating end of the sleeve 21 and the adjacent fixed cam element 26 to reduce the friction between these parts when turning with respect to each other.

The sliding clutch element is provided with loose collar 29 to which the forked ends of a yoke lever 30 are pivotally connected, the lever in turn extending horizontally through one of the side walls of the housing and being pivoted thereto as at 31. The outwardly extending end of the yoke lever is pivotally connected to the rear end of a rod 32, the front end of which is operatively connected to the hand brake lever 15.

Journalled transversely within the housing is a rock-shaft 33 having a forwardly extending arm 34 fixedly connected thereto midway between its ends. The forward end of the arm terminates in a bearing for a roller 35, the axis of which is substantially parallel to the length of said arm, and which roller is adapted to roll over the periphery of the cam 19 upon turning movement of the latter. A spring 36 is carried by the rock shaft and acts upon the arm to hold the roller in engagement with the cam at all times, while lugs 37 extend from opposite sides of the cam and connect with one end of springs 38, the other ends of which are fixed to the bottom wall of the housing. The springs 38 may be termed equalizers for normally holding the cam element 19 in the position shown in Figure 5 of the drawings, with the roller seated in the concavity 20. Lugs 39 extend inwardly from the side walls of the housing into the path of turning movement of the lugs 37 and act as stops for limiting the turning of the cam element.

The outwardly extending ends of the rocker shaft support a lever 40 and arm 41 respectively, the lower ends of both of which connect to rods 42 which extend rearward and connect with arms 43 fixed to shafts 44, the latter being operatively connected to the brake bands 45 by knuckles 46. The brake bands encircle brake drums 45', and when compressed they frictionally engage the same to set up a braking action. The upper end of the lever 40 is connected to one end of a cable 45, the other end of which extends forward to connect with the clutch pedal 14 by a spring connection 47. By providing a spring 47, it is possible to depress the clutch pedal without affecting any of the parts of the brake device for the purpose of shifting the transmission gears of the motor vehicle, but which clutch pedal is automatically depressed by a rearward pull on the cable 45 caused by the actuation of the lever 40 during operation of the brake device.

In operation, the operator of a motor vehicle when desiring to bring the vehicle to a gradual stop, actuates the brake lever 15 which imparts a pull upon the rod 32, and causes the yoke lever 30 to slide the clutch element 23 into clutching engagement with the clutch element 26, when the two coacting clutch elements are in clutching engagement, turning movement is imparted from the drive shaft 13 to the clutch element 23, and to cam 19 which turning of the cam causes the roller 35 to ride out of concavity 20 and as it does so, it raises the outer end of the rock arm 34 imparting a slight turning of the rock shaft and the resultant forward movement of the lever 40 and arm 41 which exerts a forward pull upon the rods 42, thus applying the brakes 45. The forward movement of the lower end of the lever 40 causes a backward movement of the top end which pulls the cable 45 and automatically depresses the clutch pedal 14 to disengage the engine drive shaft from the shaft 13. Upon release of the hand brake lever, the equalizing springs 38 will return the heart shaped cam 19 to normal position to receive the roller 35 and allow the forward end of the arm 34 to drop and allow the rock-shaft 33 and its operative parts to return to normal position to release the brakes.

From the foregoing description, it will be seen that I have provided a brake device for motor vehicles in which a great braking action is provided by a relatively small amount of manual effort on the part of an operator. The stopping and disengagement of the clutch of the vehicle is simultaneously controlled by the actuation of the hand brake lever, and it will be appreciated that a braking device of the nature will be found useful on motor cars when driven in heavy traffic where numerous stops are made.

While I have shown and described what I deem to be the best embodiment of my invention, it is obvious that many of the details may be varied without in anyway departing from the spirit of my invention, and I therefore do not limit myself to the exact details of construction herein set forth nor to anything less than the whole of my invention limited only by the appended claims.

What I claim as new is:—

1. In a brake apparatus for motor driven vehicles, the combination with the power shaft thereof, brake drums, brake bands encircling said brake drums, an actuating lever, a clutch element fixed to said power shaft, a cam member freely turnable with respect to said power shaft, a second clutch element splined to said cam element and slidable thereon into and out of coacting engagement with said fixed clutch element, means operable by said actuating lever for sliding said second clutch element into and out of coacting engagement with said fixed clutch element, and mechanism operable upon turning of said cam member for contracting said brake bands about said brake drums.

2. In a brake apparatus for motor driven vehicles, the combination with the power shaft thereof, brake drums, brake bands encircling said brake drums, an actuating lever, a clutch element fixed to said power shaft, a cam member freely turnable with respect to said power shaft, spring equalizing means for holding said cam member in a set position, a second clutch element splined to said cam element and slidable thereon into and out of coacting engagement with said fixed clutch element, means operable by said actuating lever for sliding said second clutch element into and out of coacting engagement with said fixed clutch element, and mechanism operable upon turning of said cam member for contracting said brake bands about said brake drums.

3. In a brake apparatus for motor driven vehicles, the combination with the power shaft thereof, brake drums, brake bands encircling said brake drums, an actuating lever, a clutch element fixed to said power shaft, spring equalizing means for holding said cam member in a set position, stop means for limiting turning movement of said cam member, a second clutch element splined to said cam element and slidable thereon, into and out of coacting engagement with said fixed clutch element, means operable by said actuating lever for sliding said second clutch element into and out of coacting engagement with said fixed clutch element, and mechanism operable upon turning of said cam member for contracting said brake bands about said brake drums.

4. In combination with the drive shaft of a motor vehicle, a clutch member fixed thereto, a turnable cam member through which said shaft extends, a second clutch element keyed to said cam member for sliding movement into and out of coacting engagement with said fixed clutch element, a rock shaft, a rock arm fixed to said rock shaft and engaging the periphery of said cam member, manually operable means for sliding said second clutch element into coacting engagement with said fixed clutch element to impart a slight turning movement to said cam member to cause the same to actuate said rocker arm and rock shaft, and brake means operable by the actuation of said rock shaft.

5. In combination with the drive shaft of a motor vehicle, a clutch member fixed thereto, a turnable cam member through which said shaft extends, a second clutch element keyed to said cam member for sliding movement into and out of coacting engagement with said fixed clutch element, a rock shaft, a rock arm fixed to said rock shaft and engaging the periphery of said cam member, manually operable means for sliding said second clutch element into coacting engagement with said fixed clutch element to impart a slight turning movement to said cam member to cause the same to actuate said rocker arm and rock shaft, and brake means operable by the actuation of said rock shaft, a motor clutch pedal, and means operatively connected to said clutch pedal and rock shaft for actuating the former upon actuation of the latter.

6. In a brake device for motor vehicles, the combination with the power shaft thereof, a clutch element fixed thereto, a heart shape cam element through which said power shaft freely extends, a second clutch element splined to said cam member for coacting engagement with said fixed clutch element, manually operable means for moving said sliding clutch element into coacting engagement with said fixed clutch element, a rock shaft, a rock arm fixed to said rock shaft, a roller journalled in the free end of said rock arm for movement over the periphery of said cam element and brake means operable by said rock shaft, substantially as and for the purpose specified.

7. In a brake device for motor vehicles, the combination with the power shaft thereof, a clutch element fixed thereto, a heart shape cam element through which said power shaft freely extends, a second clutch element splined to said cam member for coacting engagement with said fixed clutch element, manually operable means for moving said sliding clutch element into coacting engagement with said fixed clutch element, a rock shaft, a rock arm fixed to said rock shaft, a roller journalled in the free end of said rock arm for movement over the periphery of said cam element, spring means acting upon said rock arm to hold the free end down upon said cam member, and brake means operable by said rock shaft substantially as and for the purpose specified.

In testimony whereof I hereby affix my signature.

LOUIS KRUPP.